(12) United States Patent
Kim

(10) Patent No.: US 8,001,150 B2
(45) Date of Patent: Aug. 16, 2011

(54) DEVICE MANAGEMENT METHOD USING NODES HAVING ADDITIONAL ATTRIBUTE AND DEVICE MANAGEMENT CLIENT THEREOF

(75) Inventor: Te-Hyun Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 479 days.

(21) Appl. No.: 12/065,559

(22) PCT Filed: Sep. 29, 2006

(86) PCT No.: PCT/KR2006/003945
§ 371 (c)(1),
(2), (4) Date: Mar. 3, 2008

(87) PCT Pub. No.: WO2007/040324
PCT Pub. Date: Apr. 12, 2007

(65) Prior Publication Data
US 2008/0201475 A1    Aug. 21, 2008

(30) Foreign Application Priority Data
Oct. 1, 2005   (KR) .................. 10-2005-0092672

(51) Int. Cl.
G06F 7/00       (2006.01)
G06F 17/30      (2006.01)

(52) U.S. Cl. ........ 707/791; 707/797; 707/802; 707/803; 709/220; 709/223

(58) Field of Classification Search .................. 707/797, 707/802, 705, 790, 791, 803; 709/206, 226
See application file for complete search history.

(56) References Cited

U.S. PATENT DOCUMENTS

| | | | |
|---|---|---|---|
| 5,960,214 A | 9/1999 | Sharpe, Jr. et al. | |
| 6,574,662 B2 | 6/2003 | Sugiyama et al. | |
| 6,874,021 B1 | 3/2005 | Liu et al. | |
| 2002/0059272 A1* | 5/2002 | Porter | 707/100 |
| 2002/0184366 A1* | 12/2002 | Kimoto et al. | 709/224 |
| 2003/0204640 A1* | 10/2003 | Sahinoja et al. | 709/311 |
| 2004/0139188 A1* | 7/2004 | Imai | 709/223 |
| 2004/0158583 A1* | 8/2004 | Kaappa | 707/104.1 |
| 2004/0171382 A1* | 9/2004 | Mittal | 455/432.3 |
| 2005/0055397 A1* | 3/2005 | Zhu et al. | 709/200 |
| 2005/0267938 A1* | 12/2005 | Czeczulin | 709/206 |

(Continued)

FOREIGN PATENT DOCUMENTS

| | | |
|---|---|---|
| CN | 1625865 A | 6/2005 |
| JP | 2001-092687 A | 4/2001 |
| JP | 2001-313662 A | 11/2001 |
| JP | 2003-234785 A | 8/2003 |
| JP | 2005-524182 A | 8/2005 |
| JP | 2007-525870 A | 9/2007 |

*Primary Examiner* — Robert Stevens
*Assistant Examiner* — Hares Jami
(74) *Attorney, Agent, or Firm* — Birch, Stewart, Kolasch & Birch, LLP

(57) ABSTRACT

According to an embodiment of the invention, a mobile terminal and a device management method performed by the mobile terminal are discussed. The method includes: receiving, by the mobile terminal and from a server, schedule information including a command for generating a specific node for a corresponding resource of the mobile terminal; and generating, by the mobile terminal, a specific node including a common attribute and an additional attribute, according to the schedule. The common attribute includes fields which are common to other nodes of the mobile terminal. The fields which are common include an ACCESS CONTROL LIST field indicating a list of external devices that are capable of accessing the corresponding resource. The additional attribute includes fields that are specified to the specific node.

9 Claims, 6 Drawing Sheets

U.S. PATENT DOCUMENTS

2006/0041661 A1* 2/2006 Erikson et al. ................ 709/225
2006/0056436 A1* 3/2006 Horikawa .................... 370/412
2006/0085532 A1* 4/2006 Chu et al. ...................... 709/223
2006/0212558 A1* 9/2006 Sahinoja et al. .............. 709/223

* cited by examiner

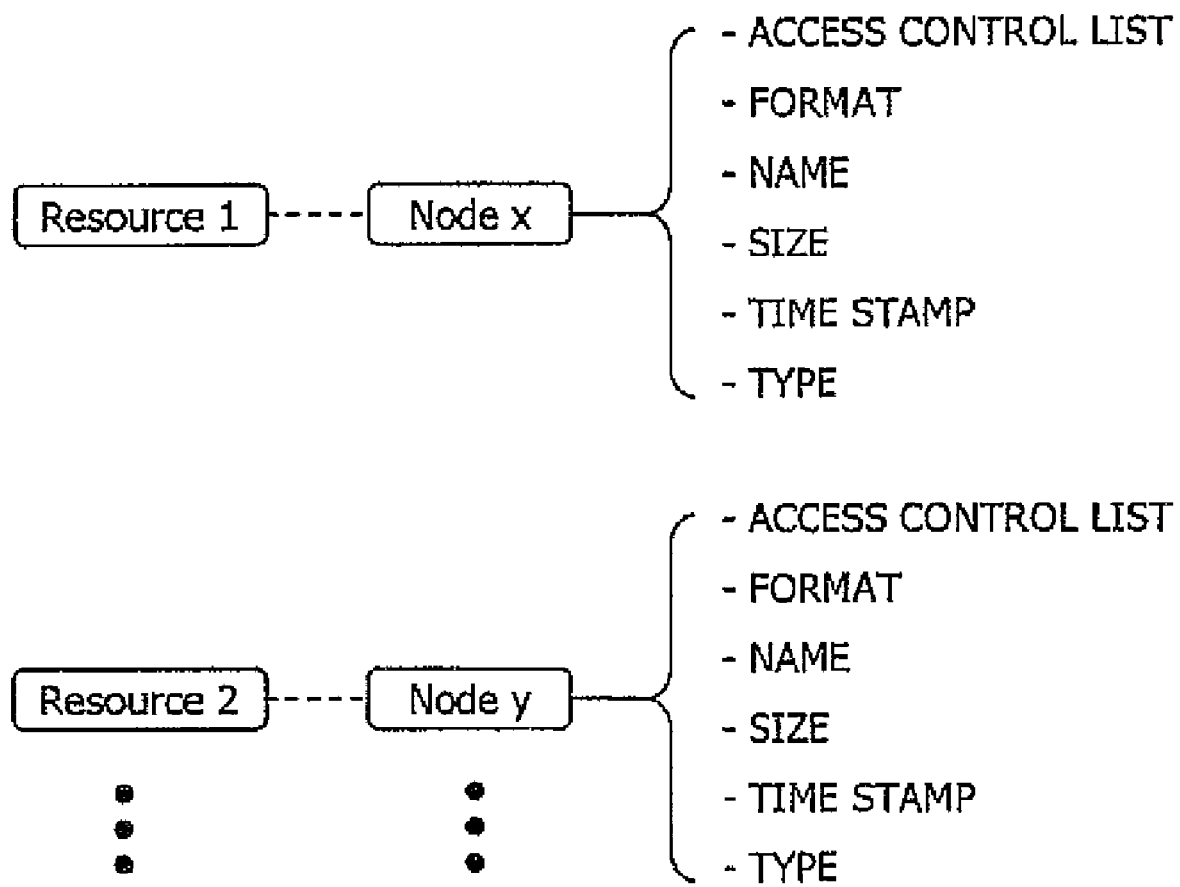
[Fig. 1]

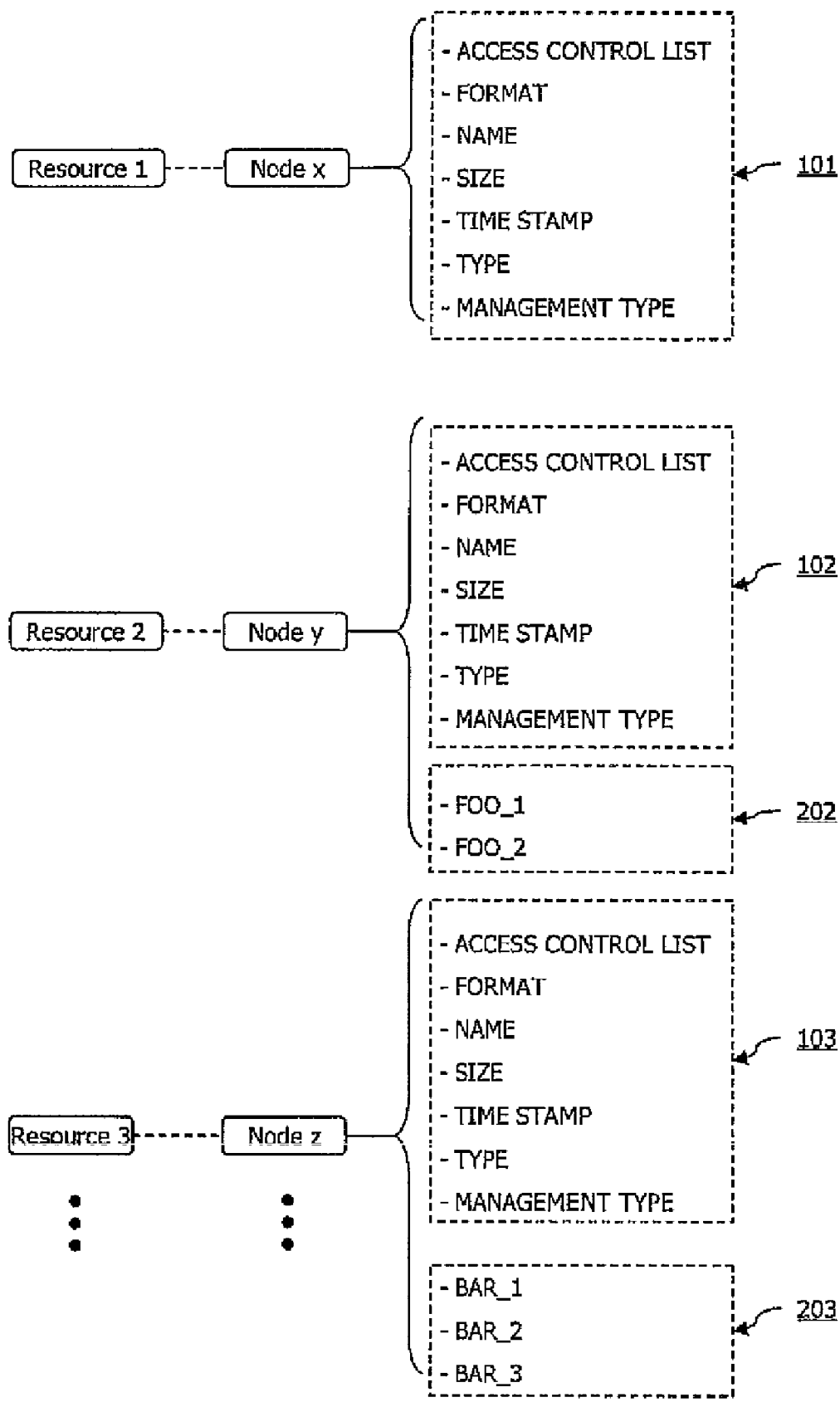
[Fig. 2]

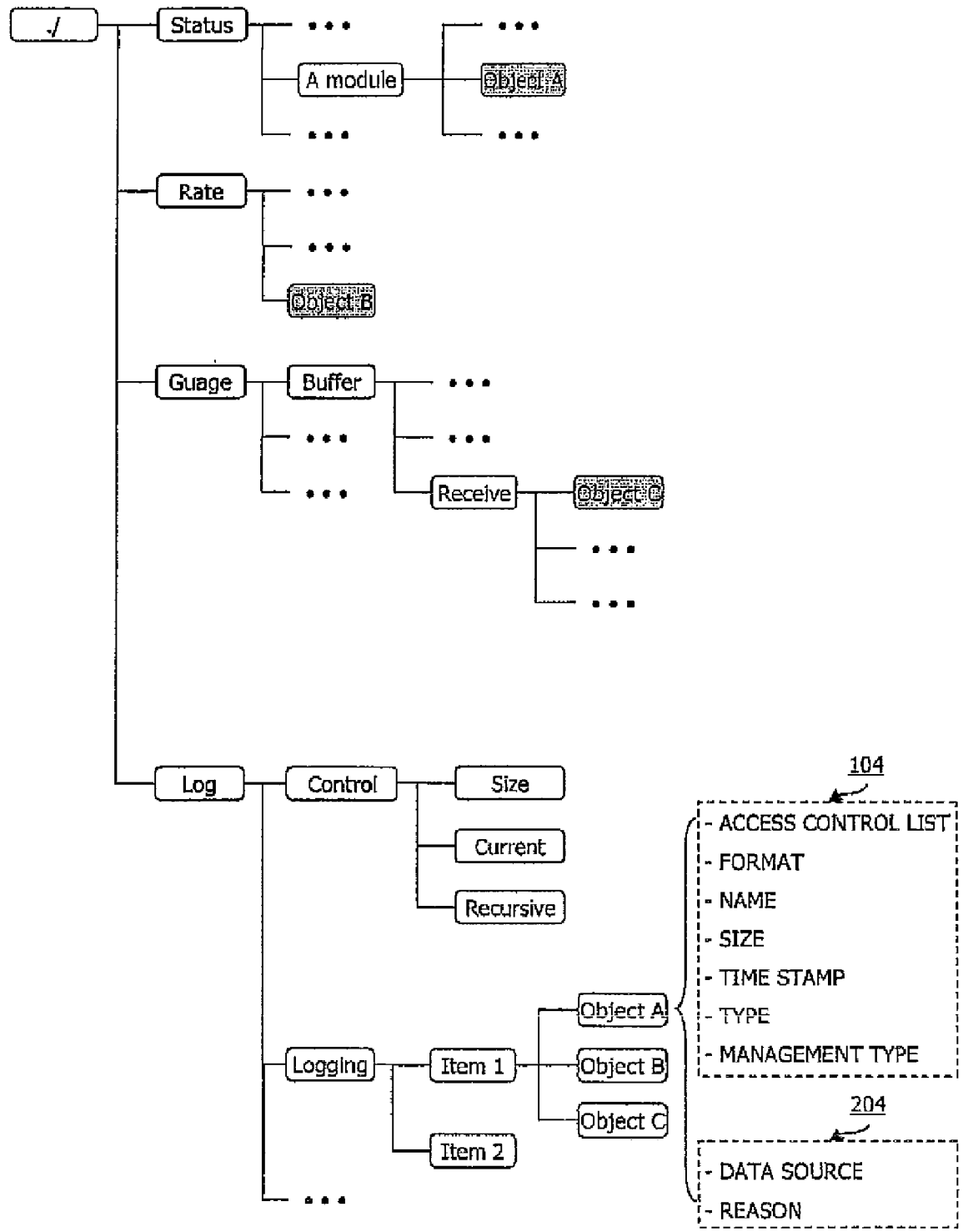
[Fig. 3]

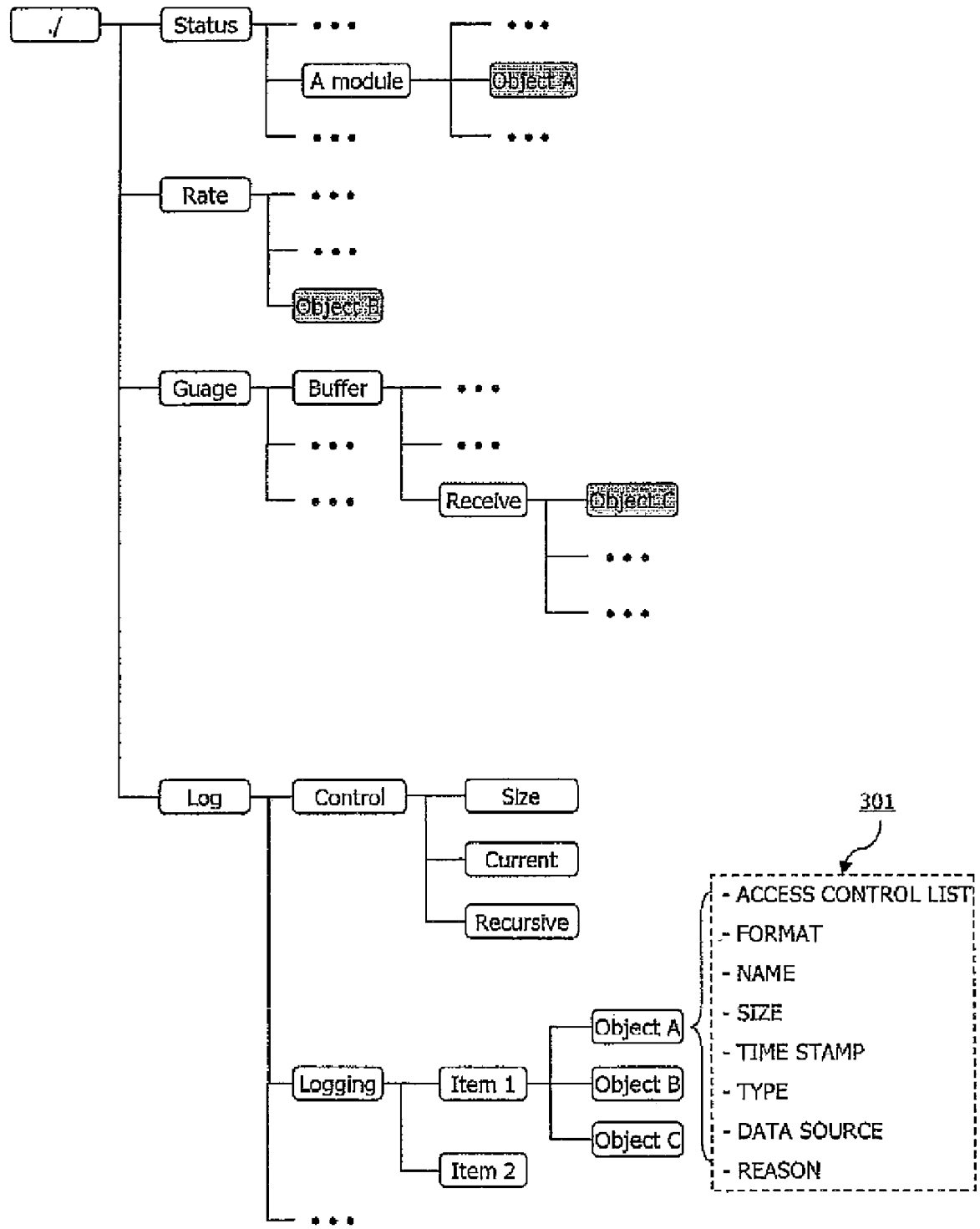
[Fig. 4]

[Fig. 5]
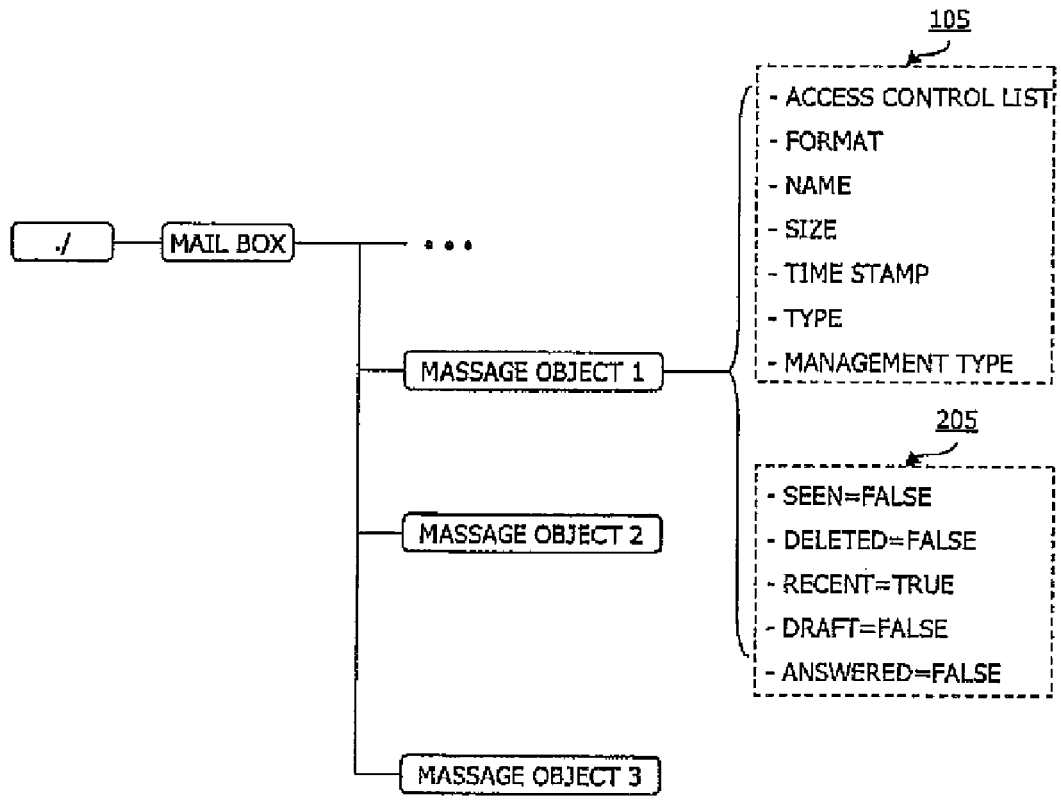
[Fig. 6]
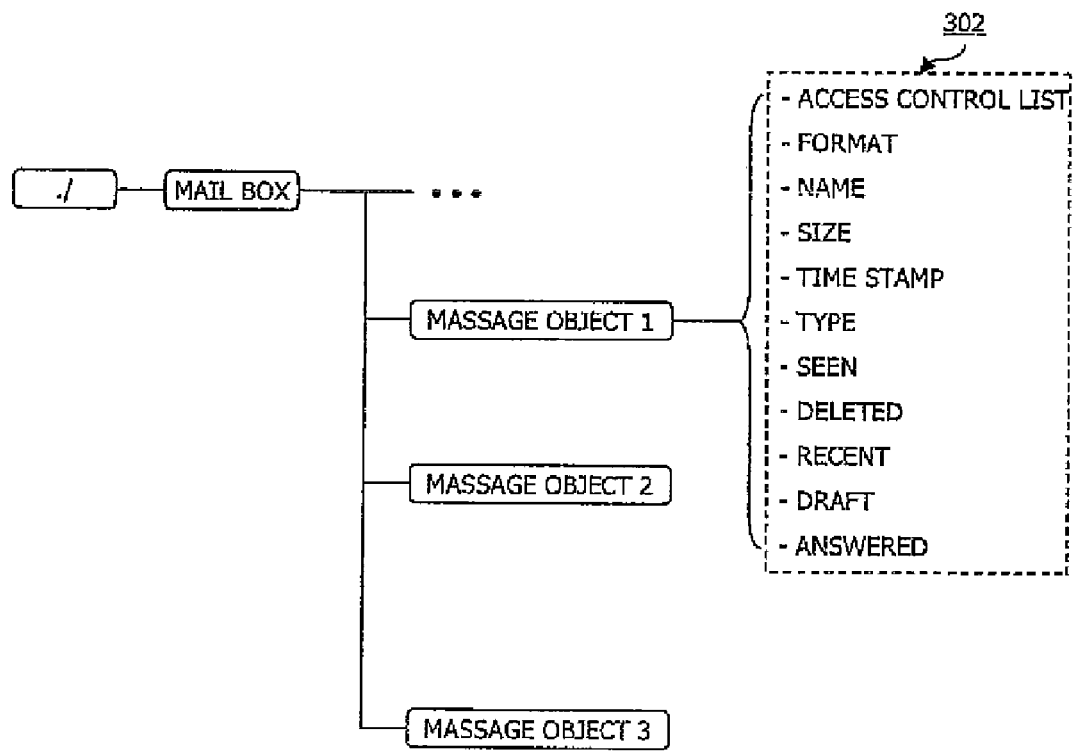

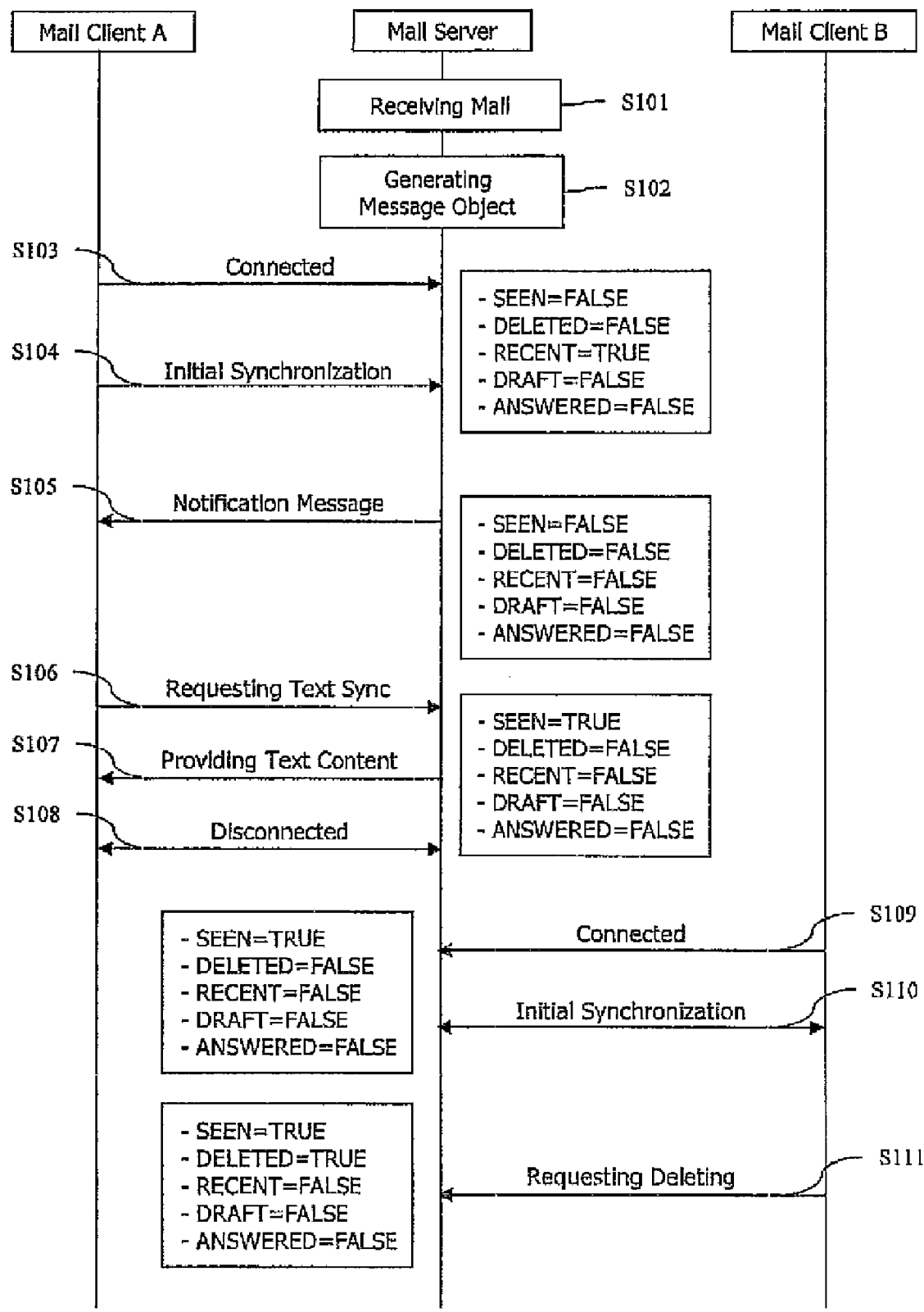
[Fig. 7]

DEVICE MANAGEMENT METHOD USING NODES HAVING ADDITIONAL ATTRIBUTE AND DEVICE MANAGEMENT CLIENT THEREOF

TECHNICAL FIELD

The present invention relates to a device management (DM) method and a DM client using an additional attribute and, more particularly, to a DM method and DM client that use additional attributes specified to a corresponding node in addition to attributes commonly required for every node.

BACKGROUND ART

In general, a DM technique is a technique for changing setting of a device (a DM client) by remotely controlling a variable or an object stored in the device by a server (DM server). Commonly, when a particular command is received from the DM server, the DM client immediately performs the corresponding command.

The DM server performs DM such as reading, changing, deleting and generating a value of a particular management object through a process in which the DM client performs the command upon receiving it.

The DM technique is a standard for supporting various functions compared with any other management technique, including a DM protocol specification, a specification relating to a way how to express a DM document, a specification relating to a way how to bind between transmission protocols, a specification relating to a DM tree and a DM node, a specification relating to a DDF (Device Description Framework), and a specification regarding notification, etc.

The DM technique is implemented such that the DM server transmits the command relating to the particular management object existing within the device and then the DM client performs the corresponding command upon receiving it. In this case, the DM object mainly exists in a database of the device and is logically connected with a node of the DM tree existing within the device. Namely, the DM server can issue a management command by accessing a node logically connected with the management object through a URI (Uniform Resource Indicator).

Thus, in order for the DM server to access resources or the object present in the DM client, each resource or object has a node. The nodes are associated with resources or objects, the DM server can access a corresponding node and manage the corresponding resource or object. In this case, in order for the DM server to manage the resources or objects associated with each node, each node has attribute values indicating information regarding the resources or objects to which it belongs.

FIG. 1 illustrates the attributes of nodes of the DM client. The resources stored in the DM client can be divided into resource 1, resource 2, etc. according to characteristics of each resource, and each node is associated with a node. A node x has fields indicating information on the resource 1 and a node y has fields indicating information on the resource 2. All the nodes of the DM client including the node x and node y have the following fields:

ACCESS CONTROL LIST: a list of external devices that can access corresponding resources
FORMAT: an encoding type of a corresponding resource
NAME: a name of a node
SIZE: a size of a corresponding resource
TIME STAMP: time point at which a value of a corresponding resource was finally changed
TYPE: a form or type of a corresponding resource The fields are applied to all types of nodes in the same manner regardless of nodes.

Namely, all the nodes have the set of same fields including ACCESS CONTROL LIST, FORMAT, NAME, SIZE, TIME STAMP and TYPE.

DISCLOSURE OF INVENTION

Technical Problem

Thus, because all the nodes have the same fields, a problem arises that an attribute suitable for the characteristics of each node cannot be expressed. For example, nodes of a message object in a mail server are preferred to have attributes that may show information such as whether a message has been read or deleted. In this respect, however, if the server provides a calendar service, there is no need to assign the attributes required for the message object. In this case, if only the attributes commonly required for the nodes of the message object and the calendar object are used likewise as in the related art, the resources logically connected with the nodes can not be effectively managed. In addition, application of the attributes required only for the message object and the attributes required only for the calendar for every node without discrimination would be a waste of a storage space.

Technical Solution

One exemplary feature of the present invention is to provide a device management (DM) method using nodes having an additional attribute which is defined according to characteristics of resources or a management object associated with the node.

Another exemplary feature of the present invention is to provide a DM method for synchronizing data between a DM server and a DM client by including an additional attribute indicating a state of a node of the DM client that communicates with the DM server in the node through DataSync.

To implement at least the above feature in whole or in parts, the present invention provides a DM client that may include a node having a common attribute that is common to every node and an additional attribute that is specified to each node.

To implement at least the above feature in whole or in parts, the present invention also provides a DM method that may include: receiving a command for generating a node; and, generating a node including a common attribute and an additional attribute, according to the command; wherein the common node includes at least one filed that is common to every node, and the additional attribute includes at least one filed that is specified to each node.

To implement at least the above feature in whole or in parts, the present invention also provides a DM client that may include: a node including a common attribute and an additional attribute; wherein, the common attribute includes at least one filed that is common to every node and the additional attribute includes at least one filed that relates to log information.

To implement at least the above feature in whole or in parts, the present invention also provides a DM client including: a node including a common attribute and an additional attribute; wherein the common attribute includes at least one filed that is common to every node of the DM client and the additional attribute includes at least filed indicating a state of a received message.

To implement at least the above feature in whole or in parts, the present invention also provides a DM method in a mail server that communicates with a plurality of mail clients, that may include: receiving a message from any mail client; generating a message object node including an additional attribute which includes at least one field indicating a state of the received message; and changing the field of the additional attribute according to a message processing request from the mail client and storing it.

To implement at least the above feature in whole or in parts, the present invention also provides a DM client having a DM tree, which may include a node having attributes with respect to log information of a management object.

To implement at least the above feature in whole or in parts, the present invention also provides a DM client including a node including at least one attribute to log data for a management object.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 is a view showing attributes of device management (DM) client nodes according to the related art;

FIG. 2 is a view showing attributes of DM client nodes according to the present invention;

FIG. 3 is a view showing a DM tree including a logging node having common attributes and additional attributes according to the present invention;

FIG. 4 is a DM tree including a logging node having an integrated attribute according to the present invention;

FIG. 5 is a view showing message object nodes of a mail server having common attributes and additional attributes according to the present invention;

FIG. 6 is a view showing the message object nodes of the mail server having an integrated attribute according to the present invention; and FIG. 7 illustrates a data synchronization process between a mail client and the mail server according to the present invention.

MODE OF THE INVENTION

The exemplary embodiment of the present invention will now be described with reference to the accompanying drawings.

FIG. 2 is a view showing attributes of DM client nodes according to the present invention. As shown, a node x has only a common attribute 101, node y has a common attribute 102 and an additional attribute 202, which includes at least one field, i.e. FOO_1 and FOO_2 fields, and a node z has a common attribute 103 and an additional attribute 203 which includes at least one field, i.e. BAR_1, BAR_2 and BAR_3.

Herein, the common attributes are common to every node, and the additional attributes refer to information required to be used for a node by node. In the related art, all the nodes have same fields, so the fields are not discriminated, but comparatively, in the present invention, because fields are differently assigned according to characteristics of a node, the fields are classified into the common attributes and the additional attributes.

As the common attribute, ACCESS CONTROL LIST, FORMAT, NAME, SIZE, TIME STAMP, TYPE and MANAGEMENT TYPE fields are used. The ACCESS CONTROL LIST field indicates a list of external devices that may access a corresponding resource, the FORMAT field indicates an encoding type of a corresponding resource, the NAME field indicates a name of a node, the SIZE field indicates a size of a corresponding resource, the TIME STAMP field indicates a time point at which a value of a corresponding resource was finally changed, the TYPE field indicates a format or type of a corresponding resource, and the MANAGEMENT TYPE field indicates a type of a node.

Of the common attributes of the node y and node z, the MANAGEMENT TYPE field should indicate a type of the node y and the node z to allow an external device such as a server to know an additional attribute of the node y and the node z. And the MANAGEMENT TYPE field should have a specific value with respect to a type of each node.

The FOO_1 and FOO_2 fields of the additional attribute in the node y are required for explaining particular characteristics of resources belonging to the node y, and the BAR_1, BAR_2 and BAR_3 fields of the additional attribute in the node z are required for explaining particular characteristics of resources belonging to the node z.

The additional attribute can be generated by the external device. When the external device transfers a command for generating a node, the command includes an instruction to generate the additional attribute. Namely, the command has a value of MANAGEMENT TYPE field indicating a type of the node to be generated.

Herein, the concept of a node is described to be limited to the DM client, but the node can be applied for a server as well as the client as a unit that can be independently implemented.

FIG. 3 is a view showing a DM tree including a Log/Logging node having a common attribute and an additional attribute according to the present invention.

The DM client can record its state value in the DM tree while performing a particular operation, to log to a DM server when predetermined conditions are met. The DM server uses the DM tree in order to remotely manage information stored in a common database in various types of devices through the same DM session and protocol.

The DM tree assigns a name to information stored in the common database, provides a path to access each information, and has attributes such as logical/physical format of the information.

As shown in FIG. 3, the DM client can have the DM tree including Status, Rate, Gauge and Log nodes according to characteristics of resources. The Status node, Rate node and Gauge node include Object A, Object B and Object C, respectively. The Objects A, B and C store a state value that changes when the DM client performs a particular operation, a periodically measured value or a value measured when a particular event occurs, etc. For example, when a value of the objects reaches a pre-set threshold value, when a particular time arrives, or when a particular event occurs in the device, the Objects A, B and C stores the value.

In the DM tree, the Log node records and stores the state value or measured value that changes in the DM client. The Log node is divided into a control part and a data part. The control part corresponds to the Log/Control node. The control part includes a Log/Control/Size node informing of a maximum number of log data that can be stored, a Log/Control/Current node informing of a location where the next log data is to be stored and a Log/Control/Recursive node informing of how to process new log data if there is no storage space. Namely, the Log node is used to control a way how to store and record the log data. Herein, the log data refers to a target stored as the state value or the measured value in the device and reported to the server when certain conditions are met.

It is noted that there is the data part of the Log node. The data part corresponds to the Log/Logging node and provides a space to allow the log data to be stored therein. The process of storing the log data below the Log/Logging node is as follows:

Step 1: The DM client receives a DM command for storing log data. The DM command includes a management object to be logged and URI of a location where to store log data of the management object. The URI of the location where the object to be logged is to be stored may be equal to Log/Logging.

Step 2: When there is a space for storing the log data, a new folder node Item1 is generated.

Step 3: Object A node, Object B node and Object C node are generated in the Item1 node.

Step 4: The log data (Object A, Object B and Object C) are copied.

Step 5: The log data with respect to the Object A is stored in Log/Logging/Item1/ObjectA, the log data with respect to the Object B is stored in Log/Logging/Item1/ObjectB, and the log data with respect to the Object C is stored in Log/Logging/Item1/ObjectC.

Namely, the values of the Object A, B and C read at a particular time point or under a certain condition are stored by generating the new nodes (Item1, Item2, Item3, . . . ,) below the logging tree. In this case, the nodes (Log/Logging/Item1/ObjectA, Log/Logging/Item1/ObjectB, Log/Logging/Item1/ObjectC) generated below the logging tree have an additional attribute for explaining the characteristics of the nodes. The additional attribute includes a DATA SOURCE field which indicates the location of the original data to be logged, and a REASON field which indicates the reason why the log data has been generated.

The DATA SOURCE field indicates the location of the original data to be logged. Accordingly, an additional attribute of the Log/Logging/Item1/ObjectA node has a field such as "DATASOURCE=./Status/Amodule/ObjectA". An additional attribute of the Log/Logging/Item1/ObjectB node has a field such as "DATASOURCE=./Rate/ObjectB". An additional attribute of the Log/Logging.Item1/ObjectC node has a field such as "DATASOURCE=Gauge/Buffer/Receive/ObjectC". Namely, they have the URI (Uniform Resource Indicator) of the Objects A, B and C.

The REASON field provides information on the reason why the logging node has been generated, namely, why the node has logged. The Log/Logging node can be generated according to a logging request of the external device (DM server). In this case, the REASON field has an ID with respect to the logging request. In addition, the Log/Logging node can be also generated according to a scheduling stored in the DM client. According to the DM scheduling method, the server schedules the DM command for the client, and the client spontaneously reports a state of the device (e.g., a terminal) at a particular time point or state and executes a scheduled program (a diagnosis program, a state logging program and a virus search program). When the Log/Logging node has been generated according to this method, its REASON field has an ID of scheduling.

In order to use the additional attribute, the MANAGEMENT TYPE field is added to a common attribute of the Log/Logging/Item1/ObjectA node, the Log/Logging/Item1/ObjectA node and the Log/Logging/Item1/ObjectA node, and the MANAGEMENT TYPE field informs of the type of the node. Herein, by making MANAGEMENT TYPE=Logging, the external device can recognize that the node relates to log data.

FIG. 4 is the DM tree including a Log/Logging node having an integrated attribute according to the present invention.

The Status node, Rate node and Gauge node of the DM tree include Object A, Object B and Object C, respectively. The Objects A, B and C store a state value that changes when the DM client performs a particular operation, a periodically measured value or a value measured when a particular event occurs.

The Objects A, B and C are copied and stored below the Log node when particular conditions are met. The Log node includes a control part, i.e. a Log/Control node and a data part, i.e. a Log/Logging node. Log data is stored in the Log/Logging node according to the steps 1 to 5 described above with reference to FIG. 3.

Accordingly, the Item1 node includes a Log/Logging/Item1/ObjectA in which the log data with respect to Object A is stored, a Log/Logging/Item1/ObjectB in which the log data with respect to Object B is stored, and a Log/Logging/Item1/ObjectC in which the log data with respect to Object C is stored.

Nodes (Log/Logging/Item1/ObjectA, Log/Logging/Item1/ObjectB and Log/Logging/Item1/ObjectC) generated below the logging tree have an integrated attribute 301 for indicating characteristics of their own together with the common attribute.

Namely, each of the Log/Logging/Item1/ObjectA, the Log/Logging/Item1/ObjectB and the Log/Logging/Item1/ObjectC has a DATA SOURCE field which indicates a location of the original data to be logged, and a REASON field which indicates the reason why the log data has been generated, as well as the common attribute including ACCESS CONTROL LIST, FORMAT, NAME, SIZE, TIME STAMP, TYPE fields.

The DATA SOURCE field indicates the location of the original data to be logged. Accordingly, a DATA SOURCE filed of an integrated attribute in the Log/Logging/Item1/ObjectA node has a value of "./Status/Amodule/ObjectA". A DATA SOURCE of an integrated attribute in the Log/Logging/Item1/ObjectB has the value of "./Rate/ObjectB". A DATA SOURCE of an integrated attribute in the Log/Logging/Item1/ObjectC node has the value of "Gauge/Buffer/Receive/ObjectC". Namely, they have the URI (Uniform Resource Indicator) of the Objects A, B and C.

The REASON field provides information on the reason why the logging node has been generated, namely, why the node has logged. The Log/Logging node can be generated according to a logging request of an external device or according to a scheduling stored in the DM client. When the Log/Logging node is generated according to the logging request of the external device, the REASON field has an ID with respect to the logging request. In case that the Log/Logging node is generated according to the scheduling, the REASON field has an ID of the scheduling.

In a different embodiment, a method for synchronizing an e-mail by using the additional attribute will now be described. When a mail server and a mail client communicate with each other by using a DataSync method, various message flags are used as additional attributes of a message object node to synchronize message objects stored in the mail server to the mail client.

FIG. 5 is a view showing the message object node of the mail server having the common attributes and additional attributes according to the present invention. As shown, the message object nodes (message object 1, message object 2 and message object 3) have the common attributes required for every node and the additional attributes required according to characteristics of each node.

For example, the common attributes may include ACCESS CONTROL LIST, FORMAT, NAME, SIZE, TIME STAMP, TYPE and MANAGEMENT TYPE fields. The ACCESS CONTROL LIST field indicates a list of mail clients that have authority of accessing a corresponding message object, the FORMAT field indicates an encoding type of a resource belonging to the message object node, the NAME field indicates the name of a node, and the SIZE field indicates a size of a stored message. The TIME STAMP field indicates a time point at which a message was finally changed, so in case of a new message, the TIME STAMP field indicates time at which the new message was received, in case of a message deleted after being read, the TIME STAMP field indicates time at which the message was deleted, and in case of a message for which a reply was sent in response to the message, the TIME STAMP field indicates time at which the replay was sent. In order for the mail client to recognize a type of the corresponding node, it uses the MANAGEMENT TYPE filed.

The ACCESS CONTROL LIST, FORMAT, NAME, SIZE, TIME STAMP, TYPE fields are examples of nodes required for every node of the mail server, and MANAGEMENT TYPE field allows the mail client to recognize a type of a corresponding node when managing nodes by using the additional attributes.

An additional attribute of the message object node includes at least one or more fields such as SEEN, DELETED, RECENT, DRAFT, ANSWERED fields. The SEEN field indicates whether a message has been read, the DELETED field indicates whether the message has been deleted, the RECENT field indicates whether a new message has been received, the ANSWERED field indicates whether a response of a message has been sent, and the DRAFT field indicates that a message has been created but not sent.

When a new message is received by the mail server, the mail server stores every received message as a message object and manages it. FIG. 5 shows a case, for example, that three messages are received by the mail server, and in a MailBox node, message objects 1, 2 and 3 are generated.

The message objects 1, 2 and 3 have common attributes of "MANAGEMENT TYPE=message" to allow the mail client to recognize that the nodes relate to messages. Values of the fields of the additional attributes are different in each message object as described in the following:

(1) Newly received message:
SEEN=False
DELETED=False
RECENT=True
DRAFT=False
ANSWERED=False Because the newly received message has not been read yet, SEEN=False, because it has not been deleted, DELETED=False, because it is not temporarily created one, DRAFT=False, because a reply to the message has not been sent, ANSWERED=False, and because it has been recently received, RECENT=True.

(2) A message to which a reply has been sent
SEEN=True
DELETED=False
RECENT=False
DRAFT=False
ANSWERED=True Because the replay has been sent after the message was read, the attributes SEEN and ANSWERED are True, while other attributes have the value of False.

(3) The message is deleted after the replay was sent
SEEN=True
DELETED=True
RECENT=False
DRAFT=False
ANSWERED=True Because the reply was sent after the message was read, the values of SEEN and ANSWERED fields are True, and because the message was deleted, the values of the DELETED field is True. Values of other filed are False.

FIG. 6 is a view showing the message object nodes of the mail server having an integrated attribute according to the present invention. In this case, the mail server communicates with the mail client according to the DataSync method, and the message object nodes include fields for indicating a state of each message object node.

The message object nodes can basically include the integrated attribute including ACCESS CONTROL LIST, FORMAT, NAME, SIZE, TIME STAMP and TYPE fields. The ACCESS CONTROL LIST field indicates a list of mail clients that have authority of accessing a corresponding message object, the FORMAT field indicates an encoding type of a resource belonging to the message object node, the NAME field indicates the name of a node, and the SIZE field indicates a size of a stored message. The TIME STAMP field indicates a time point at which a message was finally changed, so in case of a new message, the TIME STAMP field indicates time at which the new message was received, in case of a message deleted after being read, the TIME STAMP field indicates time at which the message was deleted, and in case of a message for which a reply was sent in response to the message, the TIME STAMP field indicates time at which the replay was sent.

The integrated attribute can further include SEEN, DELETED, RECENT, DRAFT and ANSWERED fields. Namely, various fields are used to synchronize the message object nodes stored in the mail server and the mail client. The SEEN field indicates whether a message has been read, the DELETED field indicates whether the message has been deleted, the RECENT field indicates whether a message is a newly received message, the ANSWERED field indicates whether a reply was sent in response to a message, and the DRAFT field indicates whether a message has been created but not sent yet.

FIG. 7 illustrates a data synchronization process between the mail client and the mail server according to the present invention. As shown, a mail client A and a mail client B can access a message stored in the mail server through the DataSync. The mail clients A and B can be a mobile terminal, a laptop computer, a desktop computer that can communicate with the mail server.

When the mail server receives a new mail (step S101), it generates a new message object for the received message. (step S102). In his case, an additional attribute of the message object has fields such as SEEN=False, DELETED=False, RECENT=True, DRAFT=False, ANSWERED=False. Because the message is a newly received message, value of RECENT filed is True and values of the other remaining fields are False.

When the mail client A is connected with the mail server (step S103), an initial synchronization is performed between the mail client A and the mail server (step S104). In the initial synchronization process, the mail server checks that there is a new mail which has not been read yet. Then, the mail server transmits a notification message to inform the mail client that there is the new mail has been received (step S105). Thereafter, the mail server changes a value of the RECENT from True to False.

Upon receiving the notification message, the mail client A transmits a text Sync request to the mail server in order to check the received mail (step S106). Upon receiving the text Sync, the mail server provides the text content to the mail client A (step S107) and changes the fields of the additional attribute Because the message is read upon the request of the text Sync of the mail client A, the value of the SEEN field is changed from False to True. Thus, the fields of the additional attribute have the following values: SEEN=True, DELETED=False, RECENT=False, DRAFT=False and ANSWERED=False.

Thereafter, the mail client A and the mail server are disconnected (step S108), and when the mail client B requests connection to the mail server (step S109), initial synchronization is made between the mail server and the mail client B (step S110). In this case, the fields of the additional attribute have the following values: SEEN=True, DELETED=False, RECENT=False, DRAFT=False and ANSWERED=False.

Subsequently, when the mail client B requests deletion of the message from the mail server (step S111), the fields of the additional attribute are changed. Because the request is made to delete the already read mail, the value of the SEEN filed which has been True is not changed and the value of the DELETED field is changed from False to True. Accordingly, the additional attribute of the message object in the mail server has fields such as SEEN=True, DELETED=True, DRAFT=False and ANSWERED=False.

Accordingly, the user can read or delete the message of the mail server, or send a reply to the message, by using the plurality of mail clients such as the mobile phone, the PDA or the notebook computer. Such content is recorded in the mail server through synchronization with the mail server. Thereafter, when the user is connected with the mail server again by using a different mail client, the previously operated content appears as it is.

As so far described, the DM method and the DM client using additional attributes according to the present invention have the following advantages.

That is, for example, first the attributes specific to a corresponding node, as well as the attributes common to every node, can be included in the node attributes and the management method can be differentiated according to a type of each node.

Namely, recognizing the problem that every node cannot be effectively managed with the same attributes because characteristics of resources belonging to each node are different, the inventor of the present invention solves the problem as described above.

In addition, because an additional attribute are assigned only to a particular node, various values can be stored by using a smaller space of a memory.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A device management method performed by a mobile terminal, the method comprising:
   receiving, by the mobile terminal from a server, schedule information including a command for generating a specific node for a corresponding resource of the mobile terminal; and
   generating, by the mobile terminal, the specific node including a common attribute and an additional attribute, according to the schedule information,
   wherein the common attribute includes fields which are common to other nodes of the mobile terminal,
   wherein the fields which are common include an ACCESS CONTROL LIST field indicating a list of external devices that are capable of accessing the corresponding resource,
   wherein the additional attribute includes fields that are specified to the specific node,
   wherein if the generated specific node relates to log data, the fields of the additional attribute include information indicating a reason for generating the log data, and
   wherein the fields further include a FORMAT field indicating an encoding type of the corresponding resource, a NAME field indicating a name of the corresponding resource, a SIZE field indicating a size of the corresponding resource, a TIME STAMP field indicating a time point at which a value of the corresponding resource was finally changed, a TYPE field indicating a format or type of the corresponding resource, and a MANAGEMENT TYPE field indicating a type of the specific node.

2. The method of claim 1, wherein if the generated specific node relates to the log data, the fields of the additional attribute include information indicating a location of original data to be logged.

3. The method of claim 1, wherein if the generated specific node relates to an e-mail message, the fields of the additional attribute include information indicating whether that the e-mail message has been read.

4. The method of claim 1, wherein if the generated specific node relates to an e-mail message, the fields of the additional attribute include information indicating whether the e-mail message has been deleted.

5. The method of claim 1, wherein if the generated specific node relates to an e-mail message, the fields of the additional attribute include information indicating that the e-mail message is a newly received message.

6. The method of claim 1, wherein if the generated specific node relates to an e-mail message, the fields of the additional attribute include information indicating that the e-mail message has been created but has not been sent yet.

7. The method of claim 1, wherein if the generated specific node relates to an e-mail message, the fields of the additional attribute include information indicating that a reply to the e-mail message has been sent.

8. A logging method using a device management protocol, the method comprising:
   receiving, by a mobile terminal from a server, schedule information including a command for storing log data,
   wherein the command includes information about a management object to be logged and URI (uniform resource indicator) information of a location where to store log data for the management object is to be stored;
   determining, by the mobile terminal, whether there is enough space in the mobile terminal for storing the log data;
   generating, by the mobile terminal, a specific node in which the log data is stored, according to the schedule information,
   wherein the specific node is generated using the URI information,
   wherein the specific node including a common attribute and an additional attribute,
   wherein the common attribute includes fields that are common to other nodes of the mobile terminal, wherein the fields that are common include an ACCESS CONTROL LIST field indicating a list of external devices that are capable of accessing the corresponding resource,
wherein the additional attribute includes fields that are specified to the specific node, and
wherein the fields of the additional attribute includes a DATA SOURCE field indicating a location of original data to be logged and a REASON field indicating a reason why the log data is stored;
reading values of the management object at a particular time point; and
storing the read values into the specific node,
wherein if the log data is stored according to a request of the server, the REASON field has a value indicating an ID of the request, and
wherein the fields further include a FORMAT field indicating an encoding type of the corresponding resource, a NAME field indicating a name of the corresponding resource, a SIZE field indicating a size of the corresponding resource, a TIME STAMP field indicating a time point at which a value of the corresponding resource was finally changed, a TYPE field indicating a format or type of the corresponding resource, and a MANAGEMENT TYPE field indicating a type of the specific node.

9. A mobile terminal configured to perform a device management method, the mobile terminal programmed to:

receive, from a server, schedule information including a command for generating a specific node for a corresponding resource of the mobile terminal; and
generate the specific node including a common attribute and an additional attribute, according to the schedule information,
wherein the common attribute includes fields which are common to other nodes of the mobile terminal,
wherein the fields which are common include an ACCESS CONTROL LIST field indicating a list of external devices that are capable of accessing the corresponding resource,
wherein the additional attribute includes fields that are specified to the specific node,
wherein if the generated specific node relates to log data, the fields of the additional attribute include information indicating a reason for generating the log data, and
wherein the fields further include a FORMAT field indicating an encoding type of the corresponding resource, a NAME field indicating a name of the corresponding resource, a SIZE field indicating a size of the corresponding resource, a TIME STAMP field indicating a time point at which a value of the corresponding resource was finally changed, a TYPE field indicating a format or type of the corresponding resource, and a MANAGEMENT TYPE field indicating a type of the specific node.

* * * * *